United States Patent [19]

Mass et al.

[11] Patent Number: 4,653,430
[45] Date of Patent: Mar. 31, 1987

[54] MODULAR CHICKEN HOUSES AND EGG COLLECTING MEANS

[76] Inventors: Nissim Mass; Hanan Zur, both of Kibbutz Mishmar Haemek, Israel

[21] Appl. No.: 851,197

[22] Filed: Apr. 14, 1986

Related U.S. Application Data

[63] Continuation of Ser. No. 687,196, Dec. 28, 1984, abandoned, which is a continuation of Ser. No. 495,428, May 17, 1983, abandoned.

[30] Foreign Application Priority Data

May 27, 1982 [IL] Israel .................................... 65900

[51] Int. Cl.$^4$ .............................................. A01K 31/16
[52] U.S. Cl. ..................................................... 119/48
[58] Field of Search .......................... 119/45 R, 48, 17

[56] References Cited

U.S. PATENT DOCUMENTS

| | | | |
|---|---|---|---|
| 2,728,324 | 12/1955 | Radocy | 119/45 R |
| 2,781,023 | 2/1957 | Brembeck | 119/45 R |
| 3,381,664 | 5/1968 | Barlocci | 119/17 |
| 3,498,267 | 3/1970 | Leeming | 119/48 X |
| 3,867,903 | 2/1975 | Fleshman | 119/17 |

Primary Examiner—Hugh R. Chamblee
Attorney, Agent, or Firm—Toren, McGeady and Goldberg

[57] ABSTRACT

The chicken coops of this invention are built up of modular parts, the basic element being partitions separating individual cells from one another in which cells egg laying hens are confined. Each such partition has an uppermost edge which extends obliquely relative to one of the vertical edges of the partition and forms an acute angle therewith. The lowermost portion of each partition is wider than the major extension thereof. This outjutting extension serves as support for a conveyor band onto which the eggs roll from the said cells.

10 Claims, 10 Drawing Figures

MODULAR CHICKEN HOUSES AND EGG COLLECTING MEANS

This is a continuation of application Ser. No. 687,196, filed Dec. 28, 1984 now abandoned, which was a continuation of Ser. No. 495,428, filed May 17, 1983, now abandoned.

FIELD AND BACKGROUND OF INVENTION

The present invention relates to chicken coops and more particularly to chicken coops in which chickens, the eggs of which are destined for hatching or consuming, are kept.

Especially, the invention relates to arrangements for automatically collecting laid eggs. In the known constructions for the said purpose there are usually provided individual cells, each of which is to be occupied by one hen. These cells have a slanting bottom so that a freshly laid egg rolls on the said bottom towards a conveyor band which transports the eggs to a collecting point.

There exists a number of requirements which are expected to be fulfilled by the installations of this kind, some important—but not exclusively these—are the following:

(a) to create conditions which cause the fowls to actively produce eggs at their maximal capacity,
(b) to ensure that eggs are not sullied or contaminated and arrive absolutely clean at the collecting point,
(c) to prevent breakage of eggs,
(d) to force the hens to lay their eggs in the predestined location from which they would reach the conveyor,
(e) to permit cleaning and/or disinfection of the constituents of the arrangement.

Many constructions are known which have been designed to meet the above mentioned requirements, but though meeting part, some of them do not fulfill all that is required.

SHORT SUMMARY OF DISCLOSURE

The present invention provides a combination of elements, out of which the chicken house and the collecting means are to be assembled and which to a large extent meets all the requirements listed above, and which is of special import in the case of chicken houses destined for heavy breeds, but suits also smaller breeds.

To this end the new combination provides individual cells or nests, each for a single hen, means being provided to permit hens to enter said cells for laying their eggs therein at appropriate times only.

As will become clear from the detailed description of a practical embodiment of the invention, all components of the chicken coop have been designed to be manufactured in a modular standard form and sizes so that they can easily be packed and transported to the site where the chicken house is to be erected.

According to one important feature of the invention, the basic element of the framework of the new modular chicken coop is constituted by the partitions separating individual cells from one another, each such partition having an edge—which is the uppermost one in the erected state—which extends obliquely to one of the vertical edges of the said partition and forms an acute angle therewith, the lowermost portion of each partition being wider than its major extension, the part of said lowermost portion which juts out from the rest serving as supporting means for a band conveyor.

In the most simple form of construction of a chicken house of this type, the said partitions are set up at distances from one another equivalent to the width of a cell, are interconnected by horizontal bars and are covered by roofing panels. In that case the whole structure is erected against the wall of a building, the partitions contacting that wall with their vertical rear edge. No rear wall is then required for the chicken house.

In those cases where a rear wall has to be provided for the chicken house, quadrangular panels, preferably of a dimension fitting the sizes of a single cell are attached to the partitions. Thus these panels serve as rear walls and at the same time stiffen the structure as a whole.

In a further development of the invention, a chicken house is erected to be approachable from two opposite sides. For that purpose the rear wall panels constitute rear wall of two oppositely disposed (so to say—"rear to rear") rows at both frontal sides of which extend band conveyors.

In yet another development, the structure comprises two runs, superposed onto one another. In that case the partition referred to above and having an oblique upper edge, is set on and is connected to a quadrangular partition part which also has an outjutting lower portion serving as support for the band conveyor.

Obviously such a "two floor" structure may be erected against an existing wall of a building or it may be fitted with a rear wall, in the manner already described. Equally it can also be constructed as a "rear to rear" structure, as also described.

SHORT DESCRIPTION OF DRAWINGS

The invention will now be described in detail and by way of example, with reference to the accompanying drawings. In the drawings:

FIG. 1 is an elevational, lateral view of the basic partition, while

DESCRIPTION OF PREFERRED EMBODIMENTS

Figure 1:
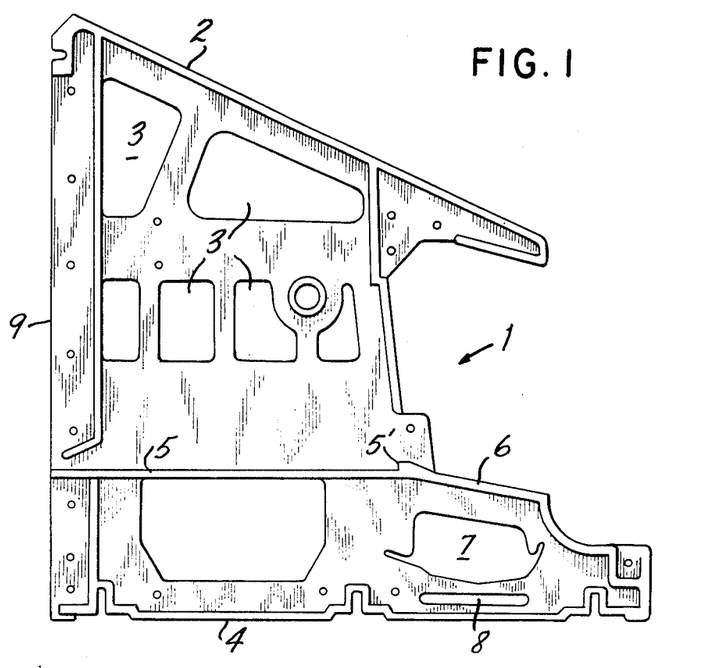

Turning first to FIG. 1, the basic element there shown consists of a panel 1 intended to serve as partition and lateral wall of a cell for a single egg laying hen. It has an oblique, flanged upper edge 2, and apertures 3 permitting circulation of air between individual cells. Some distance above the lowermost edge 4 there is attached to panel 1—on both sides of it—a rail 5. Onto the rails 5 of two vicinal partitions a basket shaped nest (not shown) can be placed. Rails 5 have at their outward ends upwardly extending noses 5″ which prevent the nests to slide outwardly. Such nests are generally known and need no further description.

From the lowermost part of partition 1, below rail 5, extends a portion 6, which is plane with the major part of partition 1. It has a large opening 7 and below it a horizontal slot 8. The purpose of these latter two will become clear later.

Figure 2:
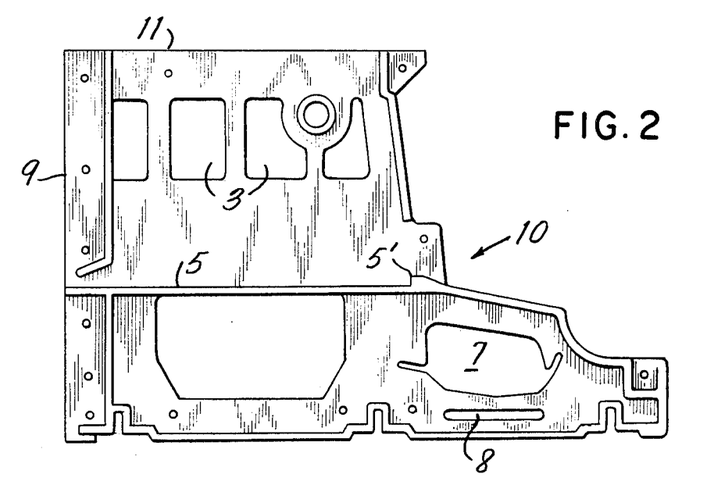
FIG. 2 is a like view of a partition for use—together with that according to FIG. 1—for a "two floor" structure.

The partition 10 shown in FIG. 2 is identical with the one at FIG. 1, except its having a horizontal upper edge 11.

Figure 3:
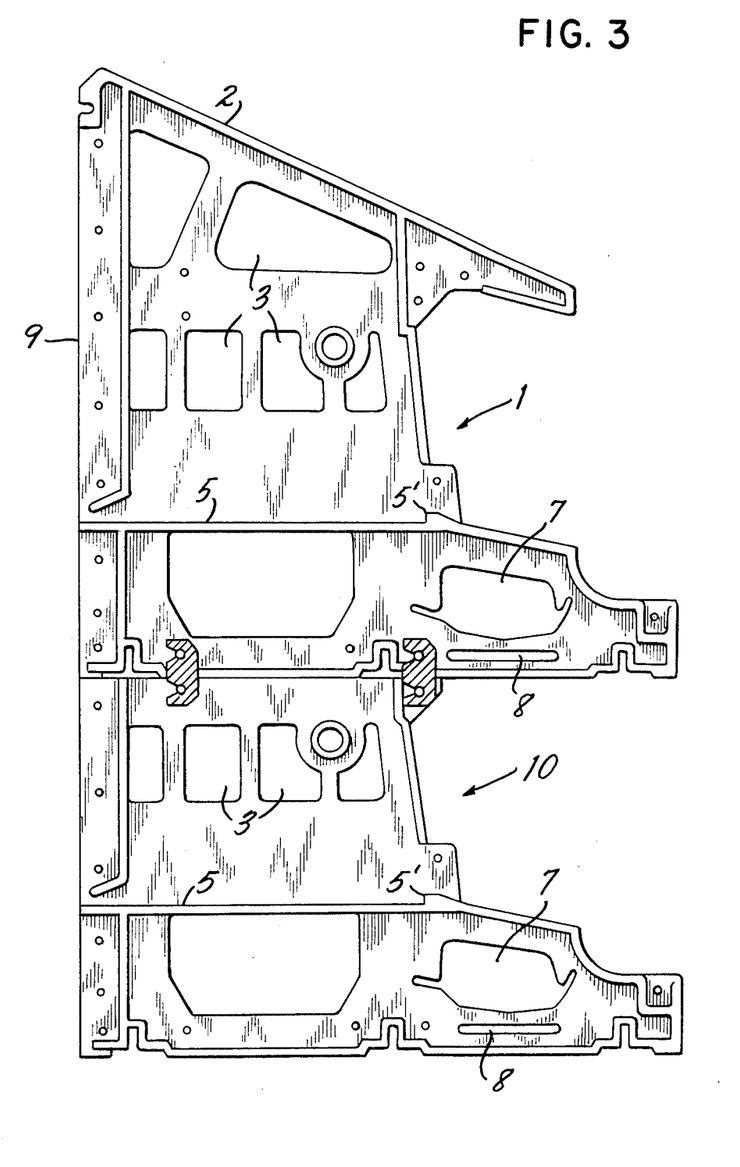
FIG. 3 shows the two elements FIGS. 1 and 2 combined and superposed onto one another.

As can be seen in FIG. 3, the partitions 1 and 10 can be connected co-planarly, as will become clear later.

It will easily be understood that either partitions 1 or partitions 1 plus 10 can be erected with the rear edge against an existing wall, in which case no rear wall for the chicken house need be provided.

Figure 4:
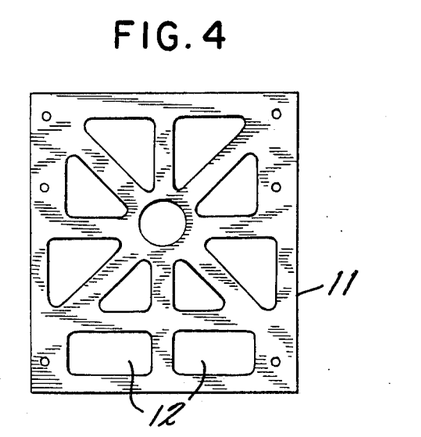
FIG. 4 shows a panel for use as a rear wall, where such is required.
Figure 5:
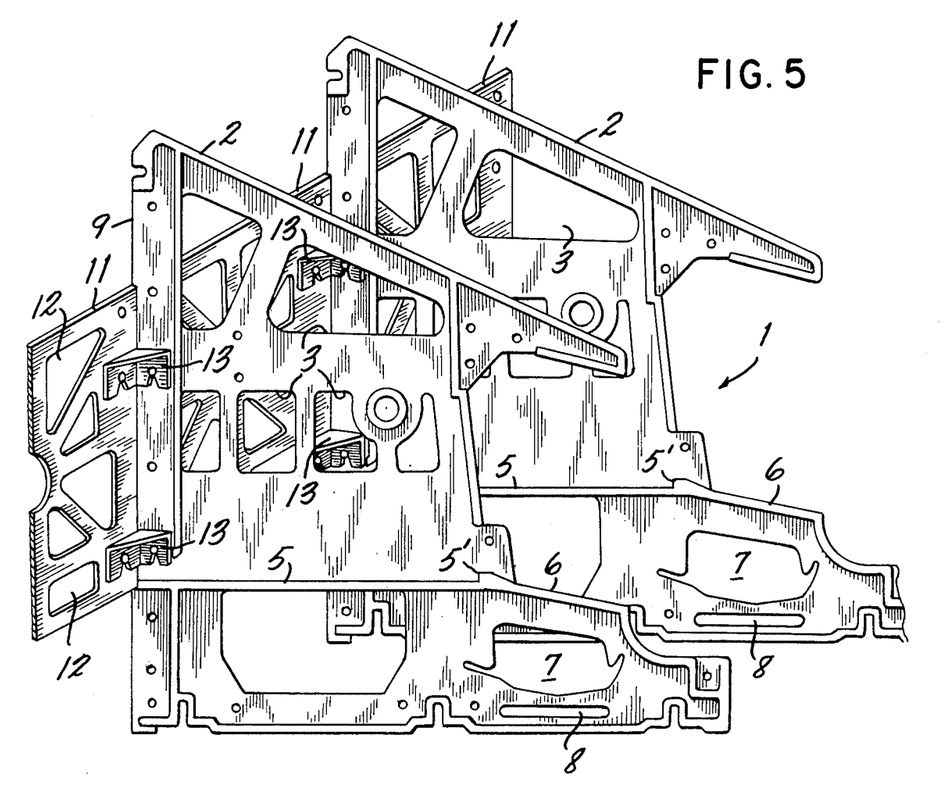
FIG. 5 illustrates the construction incorporating partition and rear wall.
Figure 6:
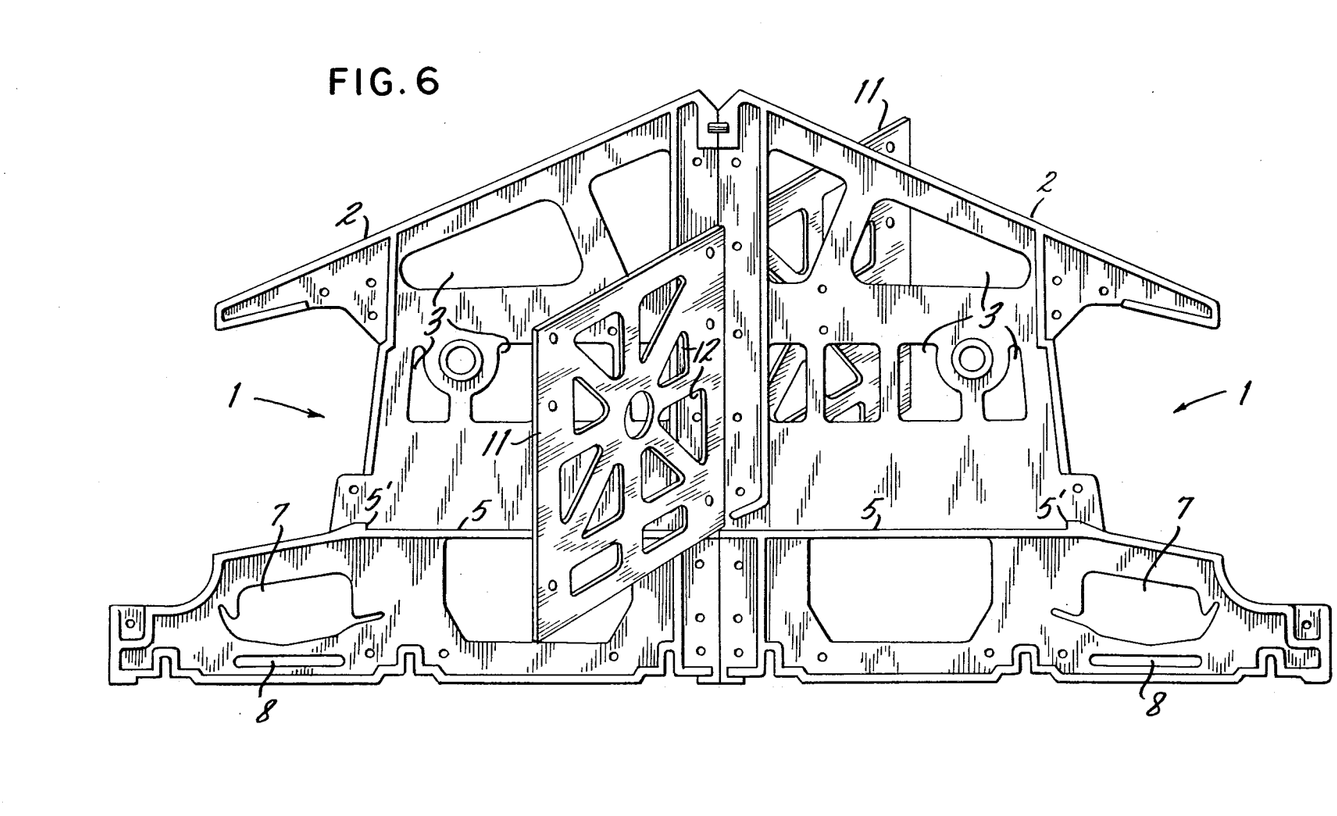
FIG. 6 illustrates the construction of a "rear to rear" structure.
Figure 7:
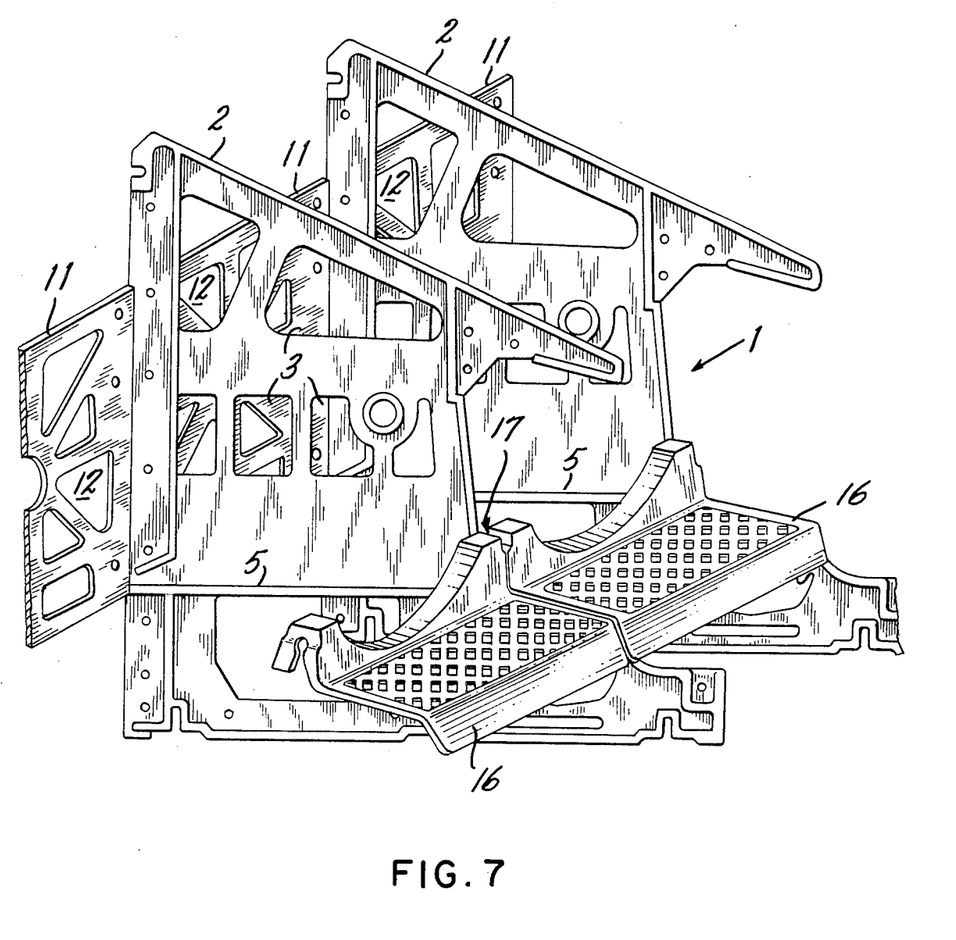
FIG. 7 illustrates the new structure in almost fully assembled state.

However, where a rear has to be given to the chicken house (be that a "single" or "two floor" structure), panels 11, according to FIG. 4 are used. These have apertures 12—for free air admittance—and can be connected with partition 1 and/or 10 by means of angle pieces 13 and screw bolts, or any other conventional means.

Where double rows, i.e. "rear to rear" structures are to be erected, as illustrated by FIG. 6, the rear walls 11 serves both rows and are connected to partitions 1 in both rows.

Figure 9:
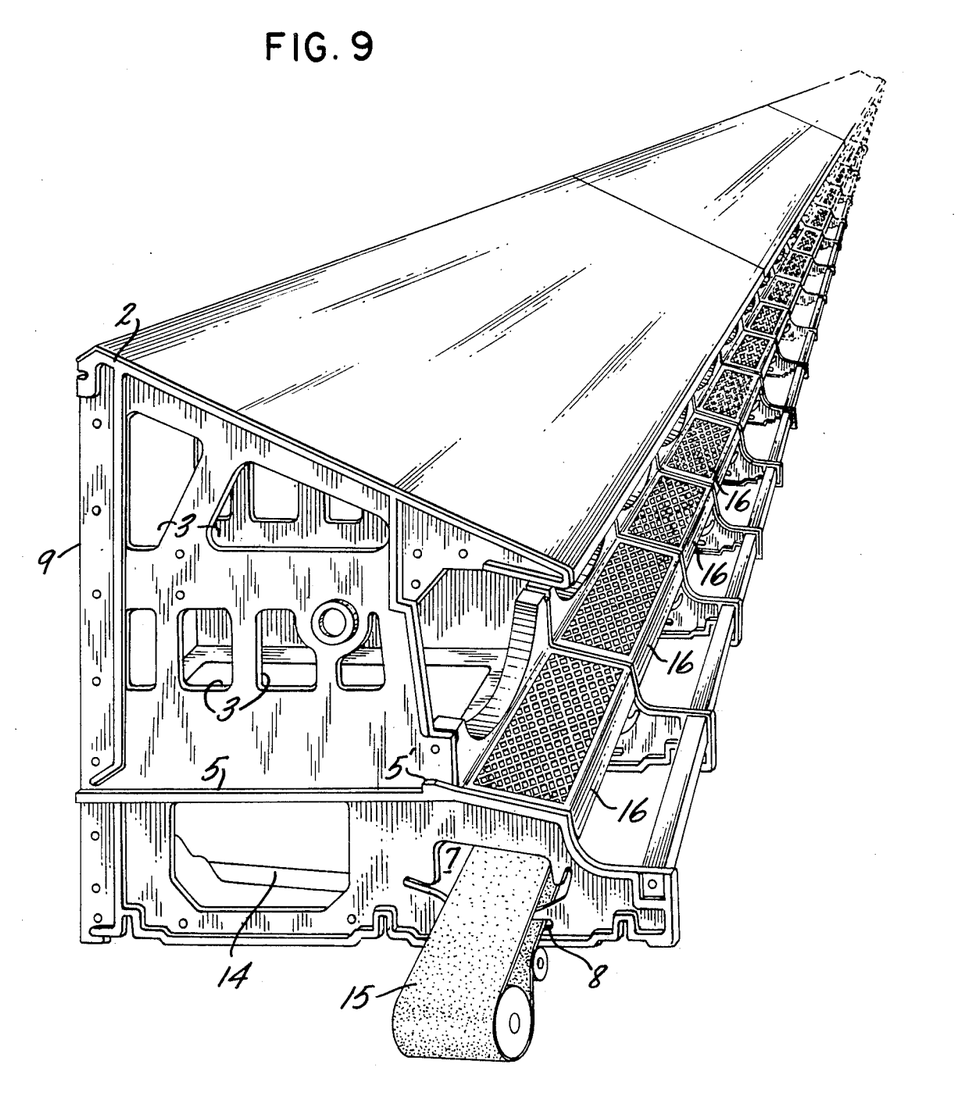
FIG. 9 shows a completed chicken house.

The aperture 7 in FIGS. 1 and 2 and the slot 8 serve the passage of a band conveyor (not shown). The conveyor is of conventional build and has a conventional drive. Its upper run, one which eggs just laid are expected to drop, passes through aperture 7 in all partitions of the respective row. The nest in which the hen sits when laying her egg is indicated in FIG. 9 by the slanting bottom 14 of the basket. The freshly laid egg rolls down the incline to drop onto the band 15 of the conveyor. This upper run of the band passes through aperture 7, while the lower run passes through slot 8.

The said upper run is covered by liftable covers 16 which swing on pivots 17 which are part of throughgoing connecting bars—as will be descibed.

Figure 8:
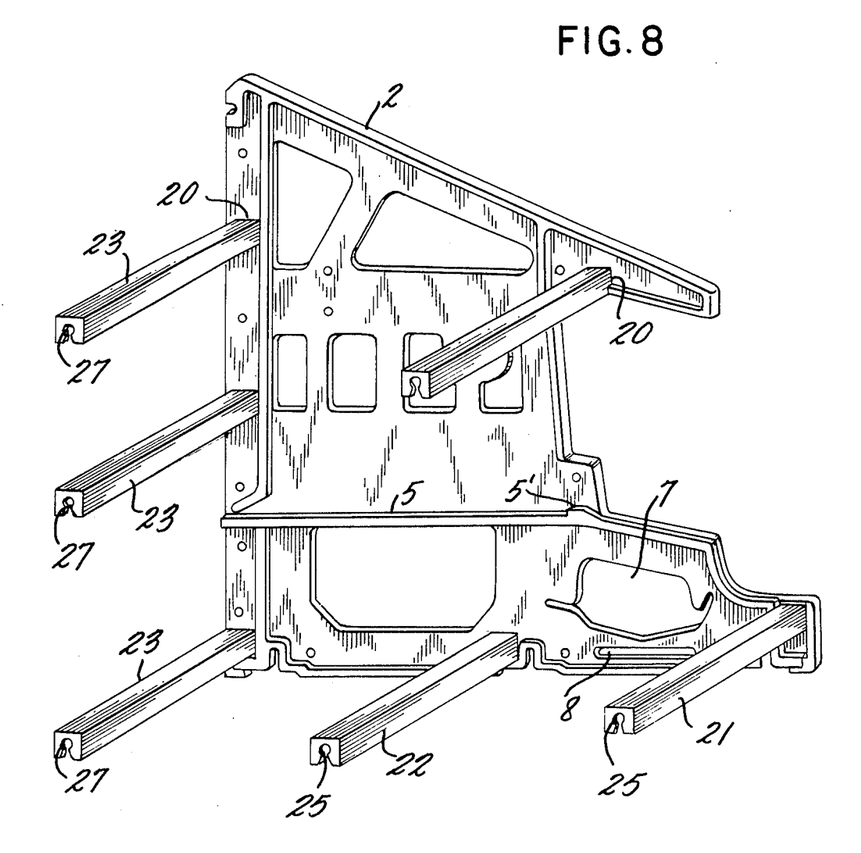
FIG. 8 illustrates the interconnection and stiffening of the skeleton formed by partitions, by means of throughgoing bars.

The partitions 1 (and 10) are connected with one another by throughgoing bars which pass through holes 20. In the example shown (see FIG. 8) six such holes are provided. However, not all of them need be used. In those cases where the partitions are erected on a base formed by a grid of [ or angle profiles, only one throughgoing bar, e.g. the foremost one indicated by the numeral 21 need be used. Otherwise bars 21, 22, 23 will be employed.

Figure 10:
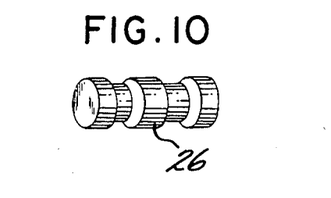
FIG. 10 illustrates a detail, i.e. a connecting member.

The bars 21, 22, 23 etc. are composed of sections, each of which spans the distance between two partitions 1 or 10. The bars are of [ profile and their ends have an end wall in which downwardly flaring slot 25 is provided. Into the slot can be inserted, once the bars are in place, headed pins 26 as shown in FIG. 10, which have portions of restricted diameter for that purpose. In this way the said bars both connect the partitions with one another and also stiffen the structure, and keep the distance between individual partitions. Undercuts 27 hold the bars in position.

It will be seen that the constituents described above can be supplied in knocked down condition and can be set up and assembled by the ultimate user without employing special tools and without exercising specialized knowledge.

We claim:

1. A chicken house having a plurality of individual cells each arranged to be occupied by one hen during egg-laying, comprising a plurality of upwardly extending vertical wall members separating the cells from one another, each wall member having a rear edge and a front edge each extending upwardly and disposed in spaced relation, a top edge extending transversely of and obliquely relative to said rear edge and forming an acute angle therewith, an upper projecting portion projecting from said front edge and forming a downward extention of said upper edge, a lower projecting portion projecting outwardly from said front edge, said lower projecting portion defining an upper opening and a lower slot-shaped opening for supporting a band conveyor having upper and lower conveyor portions, the upper portion of the band conveyor extending through the upper opening and the lower portion of the band conveyor extending through the lower opening, wherein the upper opening has a size permitting the band conveyor including an egg placed thereon to be conveyed therethrough, a plurality of horizontally extending bars connected to said vertical wall members for holding said wall members in position, and roofing panels placed on said upper edge and said upper projecting portion.

2. A chicken house in accordance with claim 1, wherein said horizontal bars extend perpendicularly to said vertical wall members, the length of each bar equal to the width of a cell.

3. A chicken house in accordance with claim 1, wherein said horizontal bars are connected to said vertical wall members by means of pins extending through holes defined in said vertical wall members, said pins having reduced diameter portions, said bars defining recesses for receiving with snap actions said reduced diameter portions.

4. A chicken house in accordance with claim 1, comprising a rear square wall member having a width equal to the width of a cell, the edges of said rear wall member connected to said rear edges of said vertical wall members, the connection effected by means of pins extending through holes in said vertical wall members and in said rear wall members, said pins having reduced diameter portions, and brackets defining recesses for receiving with snap action said reduced diameter portions.

5. A chicken house in accordance with claim 1, comprising additional vertical wall members connected to said vertical wall members, the connection effected by means of pins extending through holes defined in said vertical wall members and said additional vertical wall members, said pins having reduced diameter portions, and brackets defining recesses for receiving with snap action said reduced diameter portions, said additional vertical wall members having an additional lower projecting portion projecting outwardly from the front edge, said additional lower projecting portion defining an upper opening and a lower slot-shaped opening for supporting a second band conveyor, the upper portion of the band conveyor extending through said upper opening and the lower portion of the band conveyor extending through said lower opening, wherein the upper opening has a size permitting the second band conveyor including an egg placed thereon to by conveyed therethrough.

6. A chicken house in accordance with claim 1, wherein said vertical wall members have on both sides thereof horizontally extending rail members for supporting nests which are adapted for a sliding insertion between two vertical wall members.

7. A chicken house in accordance with claim 6, wherein said rails have upwardly protruding noses for preventing unintentional sliding of the nests out of the cells.

8. A chicken house in accordance with claim 6, wherein the floor of the nest is inclined, so that the egg rolls onto said band conveyor when the hen leaves the cells.

9. A chicken house in accordance with claim 1, comprising a cover member extending horizontally above said upper portion of said band conveyor and supported by said lower projecting part.

10. A chicken house in accordance with claim 9, wherein each cell has a permanently opened front opening through which a hen enters prior to laying an egg, said front opening defined by said front edges of said vertical wall members, said panel placed on said upper projecting part and said cover member.

* * * * *